United States Patent
Jiang et al.

(10) Patent No.: US 8,396,413 B2
(45) Date of Patent: Mar. 12, 2013

(54) PROVIDING A VIRTUAL LOCAL CHANNEL IN A SATELLITE BROADCAST SYSTEM

(75) Inventors: Hong Jiang, Warren, NJ (US); Edwin A. Muth, Bethlehem, PA (US); Martin S. Rauchwerk, Allentown, PA (US)

(73) Assignee: Agere Systems LLC, Allentown, PA (US)

( * ) Notice: Subject to any disclaimer, the term of this patent is extended or adjusted under 35 U.S.C. 154(b) by 1143 days.

(21) Appl. No.: 12/257,507

(22) Filed: Oct. 24, 2008

(65) Prior Publication Data

US 2009/0111395 A1 Apr. 30, 2009

Related U.S. Application Data

(60) Provisional application No. 61/000,352, filed on Oct. 25, 2007.

(51) Int. Cl.
*H04H 40/00* (2008.01)
(52) U.S. Cl. .................. 455/3.06; 455/456.3; 455/39
(58) Field of Classification Search ............ 455/39, 455/3.01, 3.06, 456.1, 456.3
See application file for complete search history.

(56) References Cited

U.S. PATENT DOCUMENTS

| | | | |
|---|---|---|---|
| 4,765,753 A | 8/1988 | Schmidt | |
| 5,136,612 A | 8/1992 | Bi | |
| 5,819,160 A | 10/1998 | Foladare et al. | |
| 6,246,672 B1 | 6/2001 | Lumelsky | |
| 6,249,810 B1 | 6/2001 | Kiraly | |
| 6,343,255 B1 | 1/2002 | Peek et al. | |
| 6,389,463 B2 | 5/2002 | Bolas et al. | |
| 6,418,138 B1 | 7/2002 | Cerf et al. | |
| 6,456,234 B1 | 9/2002 | Johnson | |
| 6,546,421 B1 | 4/2003 | Wynblatt et al. | |
| 6,546,427 B1 | 4/2003 | Ehrlich et al. | |
| 6,993,290 B1 | 1/2006 | Gebis et al. | |
| 7,110,720 B1 | 9/2006 | Henderson | |
| 2002/0061073 A1 | 5/2002 | Huang et al. | |
| 2002/0107016 A1 | 8/2002 | Hanley | |
| 2002/0152278 A1 | 10/2002 | Pontenzone et al. | |
| 2003/0092427 A1 | 5/2003 | Uematsu et al. | |
| 2004/0028006 A1 | 2/2004 | Kayama et al. | |
| 2005/0041641 A1 | 2/2005 | Cooley | |
| 2005/0122928 A1* | 6/2005 | Vijayan et al. ............. | 370/312 |
| 2005/0140499 A1 | 6/2005 | Lund | |
| 2005/0232140 A1 | 10/2005 | Proctor, Jr. et al. | |

OTHER PUBLICATIONS

Baier, "Tolopogies of Difference: Mapping the Emergence of a Virtual Audio Community," Society for Ethnomusicology—Midwest & Music Theory Midwest Joint Annual Conference (Apr. 2001).
Bedell, D., "Audiences sift through the vast choices of Internet radio," http://www.dougbedell.com/internetradio2001.html (Aug. 2001).
Deshpande and Gilbert, "GPRS—How Does it Work and How Good Is It?", Intel Developer UPDATE Magazine, pp. 1-5 (Oct. 2002).
"Service for Wireless Internet Access," Mobile Broadcast Network, http://www.mymbn.com/mbnserviceother.jsp (2002).

(Continued)

*Primary Examiner* — Lewis West
(74) *Attorney, Agent, or Firm* — Mendelsohn, Drucker & Associates, P.C.; David L. Cargille; Steve Mendelsohn

(57) ABSTRACT

In one embodiment, a receiver for providing a virtual local channel in a broadcast radio system that transmits a plurality of sets of local content corresponding to a plurality of different geographic regions is disclosed. The receiver includes a detector (e.g., 432), adapted to determine a regional identifier for the receiver. The receiver also includes a channel selector (e.g., 412), adapted to obtain a selected set of local content from among the plurality of sets of local content, based on the determined regional identifier, for inclusion in the virtual local channel. The determined regional identifier identifies the geographic region associated with the selected set of local content.

20 Claims, 4 Drawing Sheets

OTHER PUBLICATIONS

Beller, D. "How Internet Radio Works," HowStuffWorks, http://computer.howstuffworks.com/internet-radio.html/printable, pp. 1-3 (1998-2003).

Tyson, J. "How Wireless Internet Works," HowStuffWorks, http://computer.howstuffworks.com/wireless-internet.html/printable, pp. 1-6 (1998-2003).

Sempere, J.G., "An overview of the GSM system," IEEE Vehicular Technology Society, pp. 1-33, http://www.comms.eee.strath.ac.uk/~gonzalvez/gsm/gsm.html (printed Nov. 21, 2003).

"Capacity in a Cellular System," Monitoring Times, pp. 1-4 http://www.decodesystems.com/mt/97feb/ (Feb. 1997).

Sari et al., "On the capacity of cellular CDMA and TDMA over non-dispersive channels," http://heloise.rug.ac.be/~hs/full/j06.pdf.

Apr. 18, 2007 Office Action received in U.S. Appl. No. 10/645,961, filed Aug. 22, 2003.

Dec. 13, 2007 Final Office Action received in U.S. Appl. No. 10/645,961, filed Aug. 22, 2003.

Jul. 2, 2008 Office Action received in U.S. Appl. No. 10/645,961, filed Aug. 22, 2003.

Oct. 28, 2008 Final Office Action received in U.S. Appl. No. 10/645,961, filed Aug. 22, 2003.

Feb. 24, 2009 Office Action received in U.S. Appl. No. 10/645,961, filed Aug. 22, 2003.

Sep. 21, 2009 Office Action received in U.S. Appl. No. 10/645,961, filed Aug. 22, 2003.

Feb. 17, 2010 Office Action received in U.S. Appl. No. 10/645,961, filed Aug. 22, 2003.

Apr. 22, 2010 Final Office Action received in U.S. Appl. No. 10/645,961, filed Aug. 22, 2003.

* cited by examiner

PROVIDING A VIRTUAL LOCAL CHANNEL IN A SATELLITE BROADCAST SYSTEM

CROSS-REFERENCE TO RELATED APPLICATIONS

This application claims the benefit of the filing date of U.S. provisional application No. 61/000,352, filed on Oct. 25, 2007, the teachings of which are incorporated herein by reference.

BACKGROUND OF THE INVENTION

1. Field of the Invention

The present invention relates to digital broadcast radio systems, and, in particular, to the provision of local information to a user in a digital broadcast radio system.

2. Description of the Related Art

In recent years, satellite-based digital radio has grown in popularity among both urban and rural listeners. FIG. 1 depicts a conventional digital satellite broadcast radio system 100. System 100 typically includes not only one or more satellite transmitters 106 and receivers 104, 108 but also terrestrial transmitters 102, 110, which complement the satellite signals in areas where they may be blocked. For example, terrestrial transmitters 102, 110 may be deployed in major metropolitan areas to fill the gaps created by blockage of satellite signals by tall buildings.

FIG. 2 illustrates the manner in which conventional digital satellite broadcast radio system 100 transmits local information, such as local news, traffic, and weather, to a user via N metropolitan channels. For regulatory compliance, each of terrestrial transmitters 102, 110 broadcasts each of the N metropolitan channels to every receiver 104, 108 in the system, regardless of where the receiver is located. As such, a user in a particular region must find and tune his receiver to the particular channel that carries the local traffic information for his region. For example, a satellite radio user located in New York City receives not only the New York City traffic channel but also numerous other channels containing traffic information for other metropolitan areas, and the user must find the specific metropolitan channel that carries the New York City traffic information. Locating and tuning to one specific metropolitan channel from among the many other metropolitan channels is cumbersome and time-consuming.

SUMMARY OF THE INVENTION

Problems in the prior art are addressed in accordance with the principles of the present invention by providing a virtual local channel in a receiver, to which channel a user may tune the receiver and obtain locally relevant information, without having to locate and tune to a specific one of numerous regional information channels.

Thus, in one embodiment, the present invention is a receiver for providing a virtual local channel in a broadcast radio system that transmits a plurality of sets of local content corresponding to a plurality of different geographic regions. The receiver includes a detector (e.g., 432), adapted to determine a regional identifier for the receiver. The receiver also includes a channel selector (e.g., 412), adapted to obtain a selected set of local content from among the plurality of sets of local content, based on the determined regional identifier, for inclusion in the virtual local channel. The determined regional identifier identifies the geographic region associated with the selected set of local content.

In another embodiment, the present invention is a method for providing a virtual local channel in a receiver in a broadcast radio system that transmits a plurality of sets of local content corresponding to a plurality of different geographic regions. A regional identifier for the receiver is determined, and a selected set of local content is obtained from among the plurality of sets of local content, based on the determined regional identifier, for inclusion in the virtual local channel. The determined regional identifier identifies the geographic region associated with the selected set of local content.

In still another embodiment, the present invention is a terrestrial transmitter for a broadcast radio system comprising a plurality of terrestrial transmitters. The terrestrial transmitter is adapted to (a) receive a plurality of sets of local content corresponding to a plurality of different geographic regions; (b) generate a transmit signal comprising (i) the plurality of sets of local content and (ii) a regional identifier corresponding to the geographic region of the terrestrial transmitter; and (c) broadcast the transmit signal to a receiver adapted to generate a virtual local channel based on a set of local content selected from the plurality of sets of local content using the regional identifier.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

Figure 1:
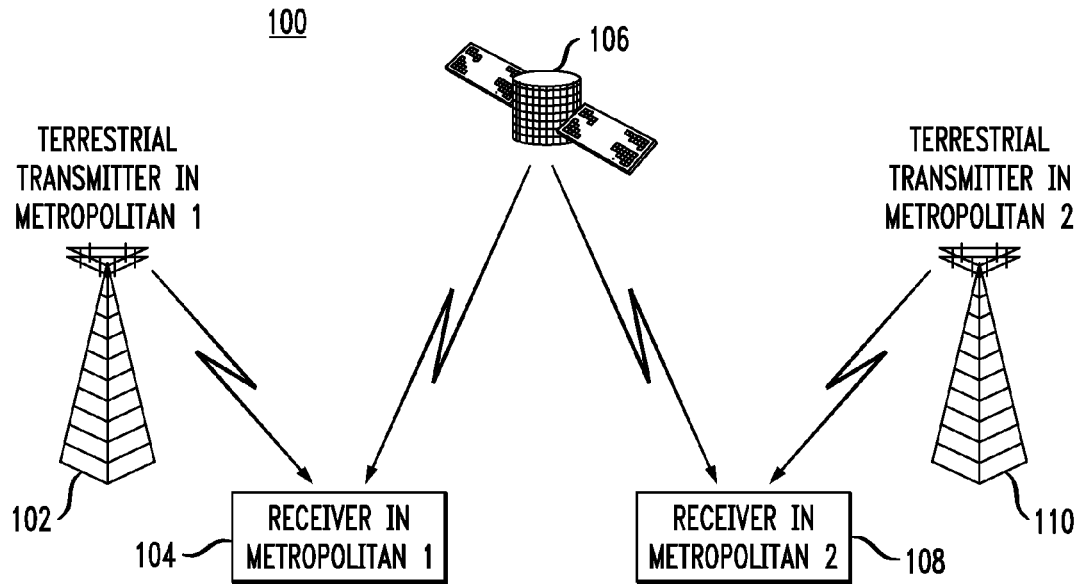
FIG. 1 is a block diagram depicting a conventional digital satellite broadcast radio system.
Figure 2:
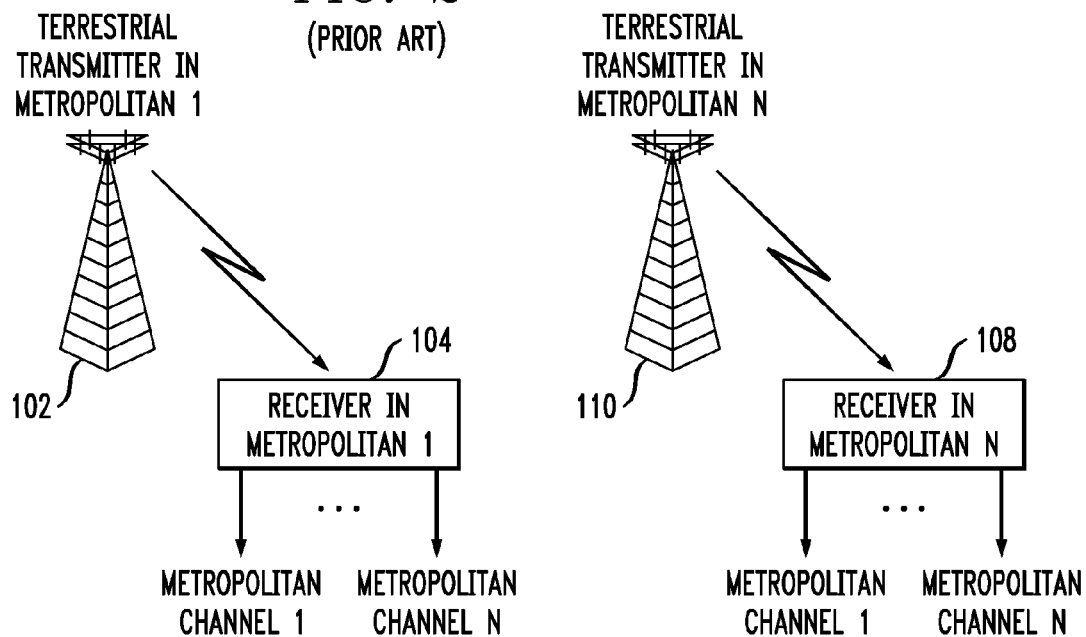
FIG. 2 is a block diagram further depicting the manner of broadcasting local content in the broadcast system of FIG. 1.
Figure 3:
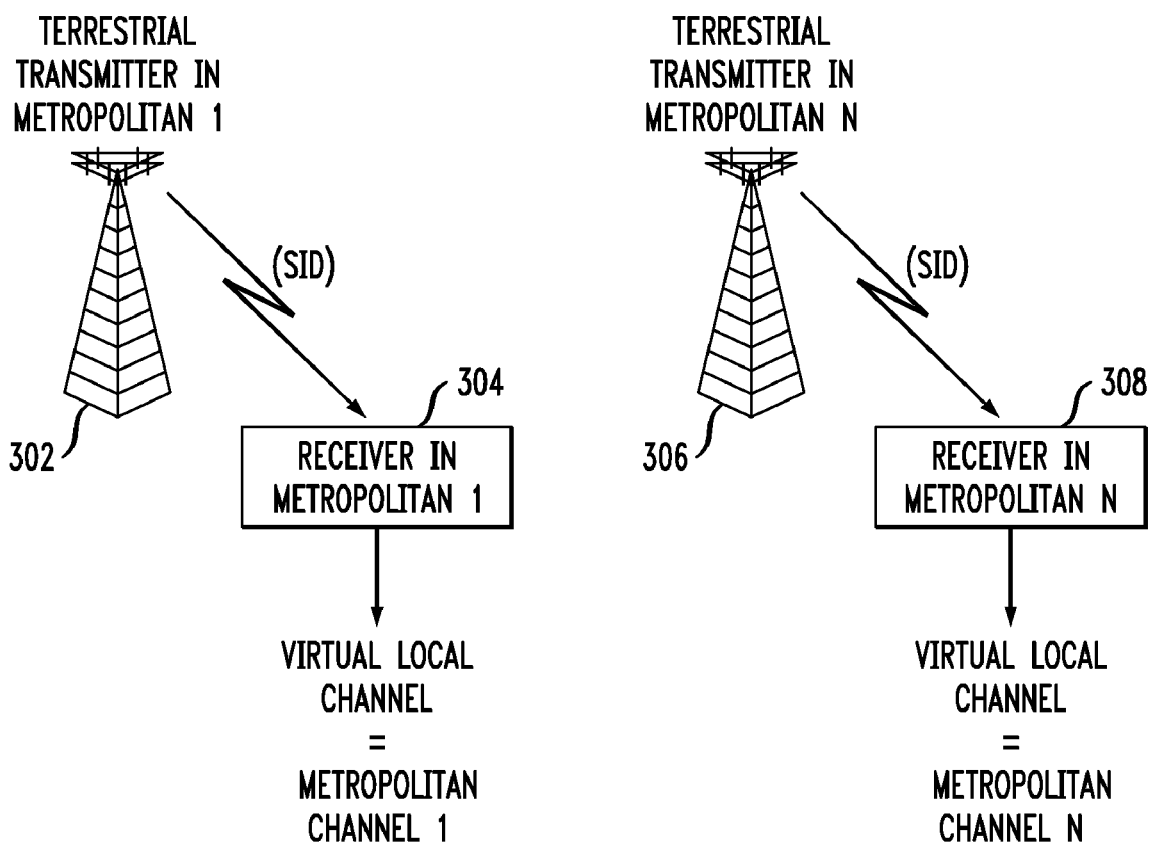
FIG. 3 is a block diagram depicting a broadcast radio system in accordance with one embodiment of the invention.

FIG. 3 illustrates an embodiment of a broadcast radio system 300 in accordance with one embodiment of the invention. In FIG. 3, terrestrial transmitters 302, 306 broadcast a plurality of local channels, including information such as news, traffic, and weather, as one or more broadcast data streams transmitted to each receiver 304, 308 in broadcast radio system 300. For example, a dedicated traffic channel may be provided for each major metropolitan area, such as New York City or Los Angeles. Assuming that broadcast radio system 300 is a satellite-based system, terrestrial transmitters 302, 306 receive the local channels from satellite transmitters (not shown), and each terrestrial transmitter 302, 306 broadcasts the same local channels, in accordance with federal regulations.

Each of transmitters 302, 306 includes an encoder circuit (not shown) that inserts into the one or more broadcast data streams a regional identifier corresponding to the geographical region or subregion in which the transmitter is located. In one embodiment, each of transmitters 302, 306 is assigned a unique station identifier ("SID"), and the regional identifier transmitted by each of transmitters 302, 306 comprises the respective transmitter's station identifier.

The regional identifier is preferably periodically transmitted (e.g., every 10 minutes) by transmitters 302, 306 to the receivers within their respective geographic areas. In one embodiment, transmitters 302, 306 insert the regional identifier into a dedicated field within the broadcast data stream. In another embodiment, where the broadcast radio signal is based on Orthogonal Frequency Domain Multiplex (OFDM) modulation, the regional identifier may be inserted into the broadcast signal using an unused subcarrier frequency in the OFDM signal.

Figure 4:
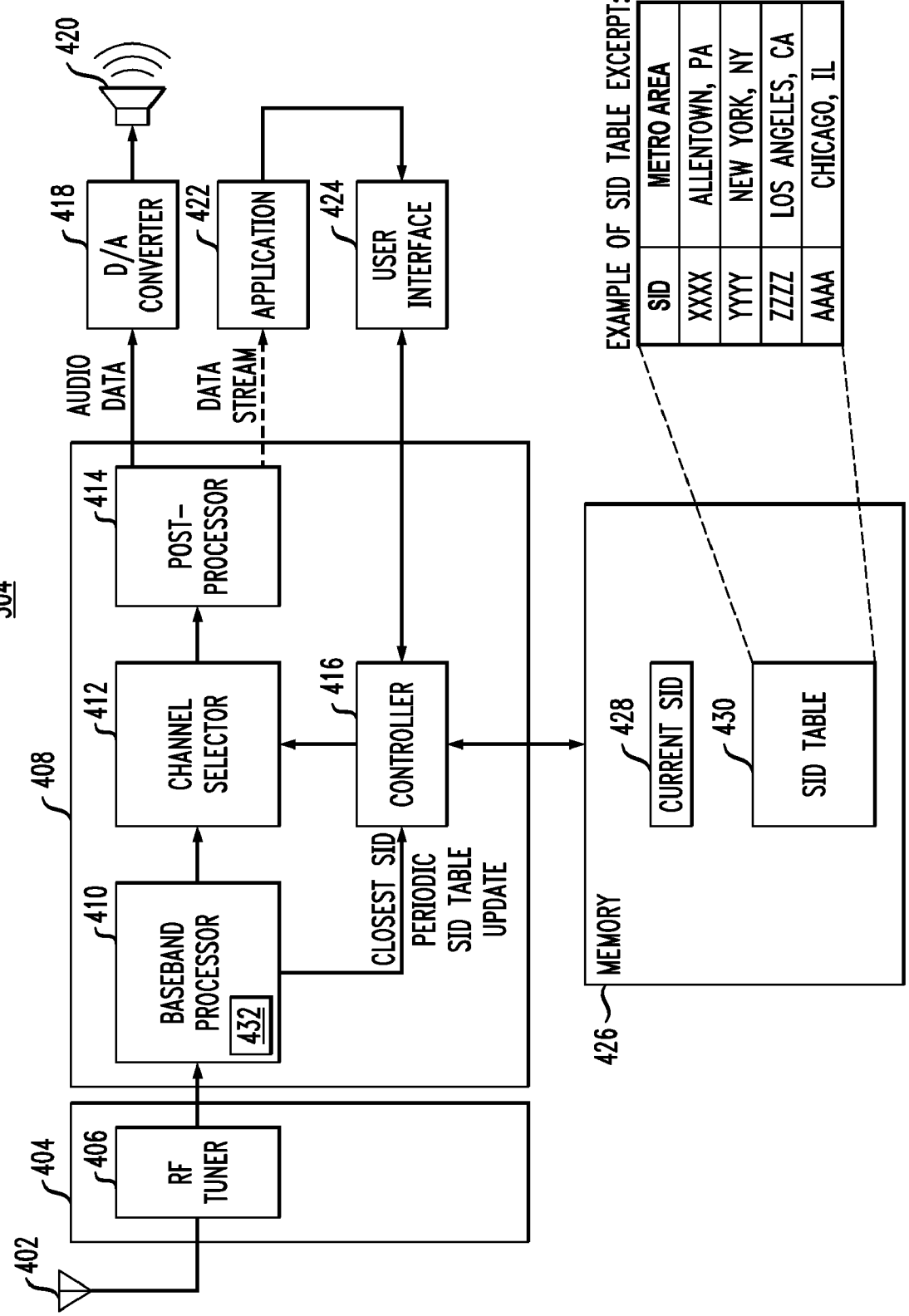
FIG. 4 is a block diagram depicting a broadcast radio system receiver in accordance with one embodiment of the invention.

FIG. 4 depicts a block diagram of receiver 304 in accordance with one embodiment of the invention. As shown in FIG. 4, receiver 304 includes an antenna 402; an RF tuner module 404 including an RF tuner circuit 406 and one or more RF filters (not shown); a processor module 408 including a baseband processor 410, a channel selector 412, a post-processor 414, and a controller 416; a digital-to-analog converter 418; a speaker 428; a user interface 424; and a memory 426.

RF tuner circuit 406 receives the RF broadcast radio signal from antenna 402, converts it to an intermediate-frequency (IF) signal, and outputs the resulting IF signal to baseband processor 410. RF tuner circuit 406 is preferably a dual-downconversion, single-path satellite digital audio RF receiver IC suitable for use in satellite radio systems, such as the "Carina" RF receiver integrated circuit (IC) produced by LSI Corporation of Milpitas, Calif.

In processor module 408, baseband processor 410 digitally samples the IF signal from RF tuner circuit 406 and demodulates it to obtain the broadcast data stream. Channel selector 412 then extracts a desired channel of digital data from the broadcast data stream, and post-processor 414 decodes the channel digital data stream and outputs audio samples that may be played through digital-to-analog converter 418 and speaker 428. Alternatively, post-processor 414 may output the channel digital data stream to a separate application system 422, such as a GPS-based navigational system (e.g., for displaying traffic information contained within the channel digital data stream). Post-processor 414 may be implemented, e.g., as a digital signal processor (DSP) operating at 120 MHz and adapted to provide variable-rate perceptual-audio-codec (PAC) audio-compression decoding. Controller 416 initializes, manages, and coordinates the operation of receiver 304. For example, controller 416 is responsible for controlling channel selector 412 based on input from user interface 424 and for interfacing with memory 426. Controller 416 may be implemented, e.g., as an ARM7TDMI microprocessor operating at 60 MHz. Processor module 408, including baseband processor 410, channel selector 412, post-processor 414, and controller 416, may be implemented, e.g., via the "Cygnus" Generation 3.6 Baseband IC produced by LSI Corporation. Memory 426 is preferably a nonvolatile external flash memory but may be other suitable memory devices.

Baseband processor 410 in receiver 304 preferably includes a regional identifier detector 432, adapted to receive the regional identifier associated with one or more transmitters and provide the received regional identifier to controller 416. Controller 416, in turn, stores the regional identifier in a Current SID field 428 in memory 426. Because the regional identifier indicates the geographical region or subregion in which the specific transmitter that broadcast a signal is located, controller 416 may use the regional identifier to cause channel selector 412 to select the channel having local information (e.g., news, traffic, and/or weather). Post-processor 414 may then output the content of the selected channel, either audibly through the digital-to-analog converter 418 to speaker 420 or electronically as digital data to application system 422. In this manner, a "virtual local channel" can be provided in a receiver, such that a user may tune his radio to receive locally relevant information, without having to locate and tune to a specific one of numerous regional information channels. Thus, when a New York City user tunes to the virtual local channel, the New York City traffic information is presented, while a Los Angeles user tuned to the same channel is presented with the Los Angeles traffic information.

In a further embodiment, where the regional identifier comprises the station identifier ("SID"), broadcast radio system 300 preferably maintains a SID table 430 of terrestrial transmitters. SID table 430 identifies the geographic location (e.g., region or subregion) of each transmitter that corresponds to each SID, thus making it possible to identify the geographic location of a transmitter when its SID is known. SID table 430 may be updated periodically (e.g., each day) by a system-wide broadcast of a revised table. In the embodiment shown in FIG. 4, each receiver 304 in system 300 includes a SID table update circuit (e.g., within baseband processor 410) adapted to receive SID table 430 and provide it to controller 416. Controller 416, in turn, stores a local copy of SID table 430 in memory 426. The local copy of SID table 430 in memory 426 may be updated each time a SID table is received. Similarly, Current SID field 428 in memory 426 may be updated each time a new regional identifier is received from a transmitter.

Figure 5:
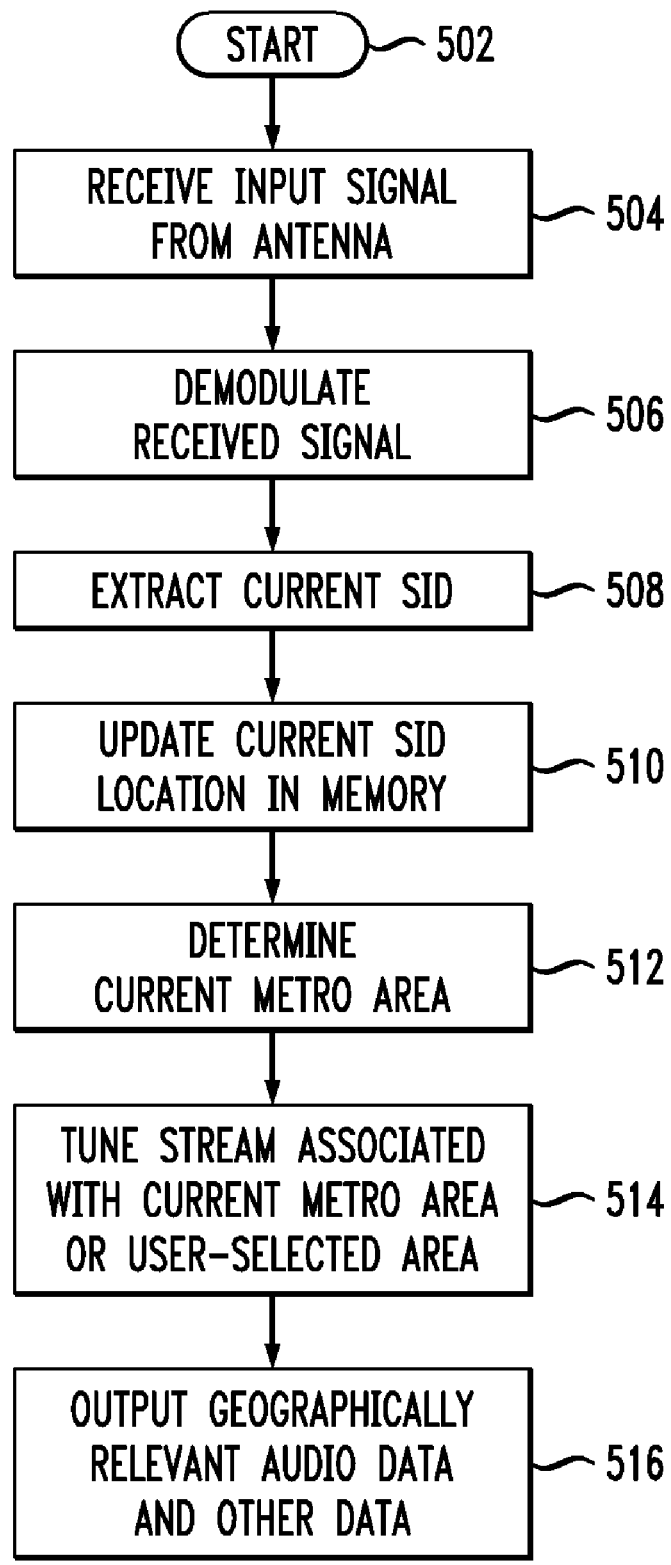
FIG. 5 is a flowchart illustrating the operation of the broadcast radio system receiver shown in FIG. 4 in accordance with one embodiment of the invention.

FIG. 5 is a flowchart depicting a method for receiving a virtual local channel in accordance with the invention. The method begins in block 502. In block 504, a broadcast radio signal including a current SID and an SID update table is received at the antenna and input to the RF tuner module 404. In block 506, RF tuner module 404 and baseband processor respectively downconvert and demodulate the received signal. In block 508, SID detector 432 in baseband processor 410 extracts the current SID (and the SID update table, if present) and provides it (or them) to controller 416. In block 510, controller 416 stores the current SID (and the SID update table, if present) in memory in block 510.

When the user tunes the radio to the virtual channel, in block 512, controller 416 in receiver 304 compares the SID stored in Current SID field 428 in memory 426 with SID table 430 to determine the geographic location of the transmitter. For example, determining the geographic location of the transmitter may be performed, e.g., via a lookup operation. When a determination can be made (e.g., when the SID matches an entry in the SID table), in block 514, controller 416 (i) selects, as the virtual local channel, the channel that carries local content for the determined geographic location and (ii) directs channel selector 412 to tune to the identified local channel. If a determination cannot be made (e.g., because the SID in the receiver's memory is invalid or does not match any entry in the SID table in the receiver's memory), a default channel setting for the virtual channel may be used. The default channel setting may be preset by the receiver manufacturer, or, alternatively, may be manually set by the user to a local channel of his choice. In block 516, after channel selector 412 tunes to the identified local channel, post-processor 414 outputs the geographically relevant content of the selected channel, either audibly through speaker 420 or electronically as digital data to application system 422.

The virtual channel described above may also be used to provide greater flexibility to broadcasters in providing local information to users. At present, Sirius Satellite Radio® transmits traffic and weather data for 18 metropolitan regions on 11 channels. As a result, certain channels carry local information for more than one metropolitan region. For example, a single channel gives information for both the Philadelphia region and the Boston region, whereas the New York metropolitan area has its own dedicated channel. The Sirius Satellite Radio® system thus saves channel bandwidth by providing less information for smaller metropolitan areas. This technique also reduces the channel-selection burden and confusion on the part of the user, because fewer channels (e.g., 11 rather than 18 channels) are dedicated to traffic and weather for local regions. Unfortunately, a user tuning to a channel carrying local information for two regions must then listen to information that is likely of little interest to the user.

Accordingly, in one embodiment of the invention, a data stream filter is provided within channel selector 412 in receiver 304 shown in FIG. 4. After a channel is selected, the data stream filter may filter the data in the channel to extract the local information relevant only to the region in which receiver 304 is located, based on the regional identifier. The local information may then be played or displayed directly to the user, or, alternatively, it may be stored (e.g., in memory 426) for later playback or display. In one embodiment, the local information is played or displayed in a repeating loop, based on how much local information is available and how often it is updated. If the local information is displayed, it may be presented to the user via user interface 424 through icons or scrolling words.

The use of a data stream filter is very advantageous, because it enables broadcasters to transmit information relevant to multiple regions on a single channel, without forcing a user to listen to information that is not relevant to the user. Moreover, because smaller regions require correspondingly small amounts of bandwidth, local information for numerous regions may be combined into a single channel, and the data stream filter will extract only the information relevant to the region of interest. Indeed, a broadcaster may provide local information relevant to as many regions as there are terrestrial transmitters, as long as sufficient bandwidth was available in the transmitted signal.

In another embodiment, a user may be provided with the option of inputting a specific geographic region (or a parameter from which the geographic region may be identified, such as a zip code) for which local information is desired. In this embodiment, receiver 304 may use the geographic region or other parameter to tune to the channel (and data stream) corresponding to the user-selected region. In this manner, a user who is traveling may obtain local information (including news, traffic, and/or weather) for his destination (e.g., Lake George, N.Y.), rather than for the region in which he is located (e.g., New York City).

Alternatively, the specific geographic region or parameter from which the region may be identified may be received from an external source, such as application system 422. In one embodiment, for example, controller 416 in FIG. 4 may be connected to application system 422, and application system 422 may input to controller 416 the geographic region or other parameter from which the region may be identified to controller 416. For example, if application system 422 is a GPS-based navigational system, application system 422 may input to controller 416 the GPS coordinates (i) of the current location of the user or (ii) of a desired location, and controller 416 may determine the geographic region based on those coordinates.

The present invention may be implemented as analog, digital, or a hybrid of both analog and digital circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, microcontroller, or general-purpose computer.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

Signals and corresponding nodes or ports may be referred to by the same name and are interchangeable for purposes here.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

The present invention can also be embodied in the form of a bitstream or other sequence of signal values electrically or optically transmitted through a medium, stored magnetic-field variations in a magnetic recording medium, etc., generated using a method and/or an apparatus of the present invention.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

We claim:

1. A receiver for providing a virtual local channel in a broadcast radio system comprising at least one transmitter that transmits a signal comprising a plurality of sets of local content corresponding to a plurality of different geographic regions, the receiver comprising:
   a front end adapted to receive the signal comprising the plurality of sets of local content corresponding to the plurality of different geographic regions;
   a detector adapted to determine a regional identifier for the receiver; and
   a channel selector adapted to obtain a selected set of local content from among the plurality of sets of local content, based on the determined regional identifier, for inclusion in the virtual local channel, wherein the determined regional identifier identifies the geographic region associated with the selected set of local content.

2. The receiver of claim 1, wherein:
the signal comprising the plurality of sets of local content corresponding to the plurality of different geographic regions is a radio-frequency (RF) signal;
the front end comprises:
   an antenna adapted to receive the RF signal;
   an RF tuner circuit adapted to downconvert the received signal; and
   a baseband processor adapted to demodulate the downconverted signal to obtain a preprocessed signal;
wherein:
the preprocessed signal includes the regional identifier; and
the detector is adapted to recover the regional identifier from the preprocessed signal.

3. The receiver of claim 2, wherein:
the RF signal is based on Orthogonal Frequency Domain Multiplex (OFDM) modulation; and
the regional identifier is contained in a subcarrier frequency channel in the OFDM signal.

4. The receiver of claim 1, wherein:
the broadcast radio system comprises a plurality of terrestrial transmitters, each transmitting the plurality of sets of local content; and
each terrestrial transmitter has a unique regional identifier.

5. The receiver of claim 1, wherein:
the broadcast radio system includes a plurality of terrestrial transmitters, each transmitting the plurality of sets of local content; and
the receiver further comprises:
   a memory adapted to store a regional identifier table that maps each regional identifier to a corresponding geographic region; and
   a controller adapted to:
      receive the determined regional identifier from the detector;
      identify a current geographic region for the receiver corresponding to the detected regional identifier, using the regional identifier table; and
      produce a control signal causing the channel selector to obtain the selected set of local content, based on the current geographic region.

6. The receiver of claim 5, wherein:
the detector is further adapted to detect an updated regional identifier table in a signal received from a terrestrial transmitter; and
the controller is adapted to store the updated regional identifier table in the memory.

7. The receiver of claim 1, wherein:
the broadcast radio system transmits the plurality of sets of local content in two or more channels, each channel comprising one or more sets of local content; and
the channel selector selects one of the channels based on the determined regional identifier and obtains the selected set of local content from the selected channel.

8. The receiver of claim 1, wherein:
the broadcast radio system transmits the plurality of sets of local content in one or more channels, a first channel comprising two or more different sets of local content corresponding to two or more different geographic regions; and
when the channel selector selects the first channel, the channel selector obtains the selected set of local content from the two or more different sets of local content in the first channel based on the corresponding determined regional identifier.

9. The receiver of claim 8, wherein:
the first channel comprises a first set of local content for a first geographic region during a first period of time followed by one or more other sets of local content for one or more other geographic regions during one or more other periods of time; and
when the selected set of local content is the first set of local content, the selected set of local content is repeated in the virtual local channel one or more times corresponding to the one or more other periods of time in the first channel.

10. The receiver of claim 1, wherein, in another mode of operation, the channel selector is adapted to obtain the selected set of local content based on (i) a user-inputted parameter or (ii) a parameter inputted from an external source.

11. In a receiver, a method for providing a virtual local channel in a broadcast radio system comprising a transmitter that transmits a signal comprising a plurality of sets of local content corresponding to a plurality of different geographic regions, the method comprising:
   receiving the signal comprising the plurality of sets of local content corresponding to the plurality of different geographic regions;
   determining a regional identifier for the receiver; and
   obtaining a selected set of local content from among the plurality of sets of local content, based on the determined regional identifier, for inclusion in the virtual local channel, wherein the determined regional identifier identifies the geographic region associated with the selected set of local content.

12. The method of claim 11, wherein:
the signal comprising the plurality of sets of local content is a radio-frequency (RF) signal;
the method further comprises:
   receiving the RF signal comprising the plurality of sets of local content;

downconverting the received signal; and demodulating the downconverted signal to obtain a preprocessed signal that includes the regional identifier; and determining the regional identifier comprises recovering the regional identifier from the preprocessed signal.

13. The method of claim 11, wherein:

the broadcast radio system comprises a plurality of terrestrial transmitters, each transmitting the plurality of sets of local content; and each terrestrial transmitter has a unique regional identifier.

14. The method of claim 11, wherein:

the broadcast radio system includes a plurality of terrestrial transmitters, each transmitting the plurality of sets of local content; and the method further comprises:

identifying a current geographic region for the receiver corresponding to the detected regional identifier, using a regional identifier table that maps each region identifier to a corresponding geographic region; and producing a control signal causing a channel selector to obtain the selected set of local content, based on the current geographic region.

15. The method of claim 14, further comprising:

detecting an updated regional identifier table in a signal received from a terrestrial transmitter; and storing the updated regional identifier table in a memory.

16. The method of claim 11, wherein:

the broadcast radio system transmits the plurality of sets of local content in two or more channels, each channel comprising one or more sets of local content; and the method further comprises selecting one of the channels based on the determined regional identifier and obtaining the selected set of local content from the selected channel.

17. The method of claim 11, wherein:

the broadcast radio system transmits the plurality of sets of local content in one or more channels, a first channel comprising two or more different sets of local content corresponding to two or more different geographic regions; and the method further comprises, when selecting the first channel, obtaining the selected set of local content from the two or more different sets of local content in the first channel based on the corresponding determined regional identifier.

18. The method of claim 17, wherein:

the first channel comprises a first set of local content for a first geographic region during a first period of time followed by one or more other sets of local content for one or more other geographic regions during one or more other periods of time; and the method further comprises, when the selected set of local content is the first set of local content, repeating the selected set of local content in the virtual local channel one or more times corresponding to the one or more other periods of time in the first channel.

19. The method of claim 11, further comprising, in another mode of operation, obtaining the selected set of local content based on (i) a user-inputted parameter or (ii) a parameter inputted from an external source.

20. A terrestrial transmitter for a broadcast radio system comprising a plurality of terrestrial transmitters, the terrestrial transmitter adapted to:

(a) receive a plurality of sets of local content corresponding to a plurality of different geographic regions;

(b) generate a transmit signal comprising (i) the plurality of sets of local content and (ii) a regional identifier corresponding to the geographic region of the terrestrial transmitter; and (c) broadcast the transmit signal to a receiver adapted to generate a virtual local channel based on a set of local content selected from the plurality of sets of local content using the regional identifier.

* * * * *